Inventors
Edgar S. Burkhardt
James D. Torrence
By Robert C. Sullivan
Attorney

United States Patent Office 3,456,889
Patented July 22, 1969

3,456,889
SPIDER BEARING ASSEMBLY FOR GYRATORY CRUSHERS
Edgar S. Burkhardt, Wauwatosa, and James D. Torrence, Milwaukee, Wis., assignors to Allis-Chalmers Manufacturing Company, Milwaukee, Wis.
Filed Apr. 10, 1967, Ser. No. 629,605
Int. Cl. B02c 2/06
U.S. Cl. 241—213          12 Claims

ABSTRACT OF THE DISCLOSURE

A spider bearing assembly for a gyratory crusher in which the upper end of the crusher shaft is provided with an upwardly open axial passage and the spider hub is provided with a downwardly open, annular passage surrounding a spider spindle which is received in the axial passage of the crusher shaft and which serves as a fulcrum for the gyrating crusher shaft. Cooperating bearing surfaces are provided in the upwardly open axial passage of the crusher shaft and on the spindle. The portion of the spider hub lying radially outwardly of the annular passage therein defines an outer sleeve portion which slidably and sealably receives the upper portion of the vertically adjustable crusher shaft. Passages are provided in the spider spindle to permit force feed lubrication of the spider bearing assembly.

BACKGROUND OF THE INVENTION

Field of the invention

This invention relates to gyratory crushers and more particularly to an improved spider bearing for the main shaft of the crusher.

Description of the prior art

In gyratory crushers of the prior art, of the type having a spider bearing support, and in which the crusher head is vertically adjustable, the usual manner of supporting the upper portion of the main shaft of the crusher is to mount a bearing sleeve on the upper portion of the crusher shaft, with the shaft being vertically slidably movable in the bearing sleeve, and with the bearing sleeve in turn being supported for fulcruming motion in a stationary bearing supported by the spider. The spider is supported by or forms part of the stationary frame or shell structure. In another modified construction which has been used, the bearing sleeve is mounted on and moves with the upper end of the main shaft of the crusher, the bearing sleeve being slidably and fulcrumly movable with respect to the stationary spider bearing.

In the prior art constructions, various problems occur which it is an object of the present invention to overcome. For example, in the prior art constructions, the bearing contact surface of the slidable main shaft or of the bearing sleeve mounted thereon are exposed to wear from the material being crushed in the crushing chamber, so that when vertical adjusting movement is imparted to the main shaft of the crusher, the bearing contact surface of the main shaft, or of the main shaft bearing sleeve, as the case may be, is subject to abrasion or roughening which accelerates excessive clearance between the relatively slidable bearing surfaces of the spider bearing assembly. Furthermore, the prior art spider bearing arrangement just described permits rock dust to collect on the outer surface of the main shaft or of the bearing sleeve thereon and to be induced into the grease lubricant of the spider bearing, when the main shaft is vertically adjusted as, for example, to adjust the clearance between the crusher head and the bowl liner or to provide adjustment for tramp iron relief or for packing relief.

Furthermore, the excessive clearance problems encountered in the prior art spider bearing assemblies has made it impractical to use oil as a lubricant for the spider bearing, which would permit the use of the more advantageous force feed or circulating lubrication systems, but has instead required the use of grease lubricant in the spider bearing cavity. The use of grease as a lubricant is less satisfactory than a forced feed oil lubrication system since the use of grease requires frequent inspection by crushing plant personnel. Furthermore, grease only provides borderline lubrication of the bearing. This is because of the gyratory motion of the crusher shaft which requires a grease with a rapid slump or relatively low viscosity to enter the bearing clearance. Operators frequently use a grease of questionable viscosity which results in poor lubrication.

SUMMARY OF THE INVENTION

Accordingly, it is an object of the present invention to provide an improved spider bearing construction for gyratory crushers which eliminates the problems encountered in prior art spider bearing constructions, such as contamination of the bearing surfaces from crusher feed, or abrasion of the bearing surfaces due to contact with the crusher feed.

It is another object of the invention to provide a spider bearing assembly for gyratory crushers which is adapted for forced feed circulating oil lubrication instead of the grease lubrication generally used in prior art spider bearing assemblies, and in which leakage of lubricant from the spider bearing assembly is eliminated.

It is another object of the invention to provide a spider bearing assembly for gyratory crushers which permits a lowering of the fulcrum point on the crusher, permitting reduction in crusher height.

It is another object of the invention to provide a spider bearing assembly for gyratory crushers which reduces stress at the upper portion of the crusher shaft.

Still another object of the invention is to provide a spider bearing construction for gyratory crushers which permits the spider arm arch to be higher than in prior art crushers thereby allowing better distribution of feed in the crushing chamber.

In achievement of these objectives, there is provided in accordance with the invention a spider bearing assembly for a gyratory crusher having a vertically adjustable crusher shaft, in which the bearing surfaces between the crusher shaft and the spider bearing are maintained out of contact with and sealed from the crusher feed, thereby preventing abrasion of the bearing surfaces, preventing contamination of the bearing surfaces from the crusher feed, and permitting force feed circulating oil lubrication of the spider bearing assembly instead of the undesirable grease lubrication frequently used in the prior art. This is accomplished by providing the upper end of the crusher shaft with an upwardly open axial bore or passage, and providing the spider hub with a downwardly open, annular passage surrounding a spider spindle, which spindle is received in the axial bore of the crusher shaft and serves as a fulcrum for the gyrating crusher shaft. The upwardly open passage of the crusher shaft and the spider spindle have cooperating bearing surfaces thereon. The spider hub includes an outer sleeve portion which slidably and sealably receives the upper portion of the vertically adjustable crusher shaft. Passages are provided in the spider spindle to permit force feed lubrication of the bearing assembly. The parts are so constructed that there is always a flushing chamber in the axial bore of the crusher shaft beneath the spider spindle or the bearing thereon.

Further objects and advantages of the invention will become apparent from the following description taken in conjunction with the accompanying drawing in which:

DESCRIPTION OF THE PREFERRED EMBODIMENT

Figures 1, 2:
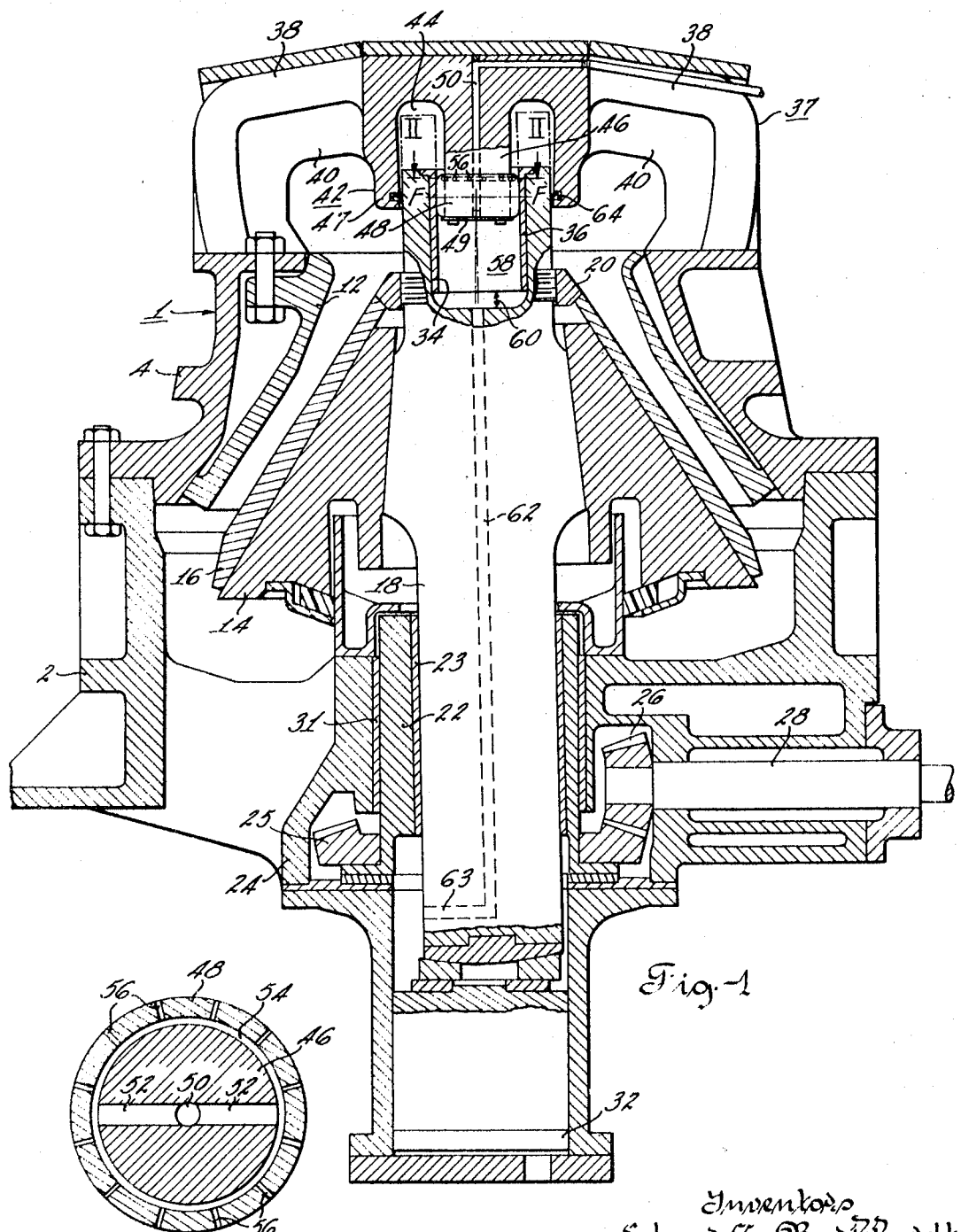
FIG. 1 is a view in vertical section of a gyratory crusher embodying the improved spider bearing assembly of the present invention.
FIG. 2 is a view in section along line II—II of FIG. 1.

Referring now to the drawing, there is shown a gyratory crusher generally indicated at 1, comprising a lower frame section 2 and an upper frame section 4. A bowl liner or concave 12 is supported within the upwardly open upper frame section 4. A crusher head 14 is mounted on shaft 18 and a crusher mantle 16 is secured on shaft 18 and on crusher head 14 by a head nut 20. A crushing cavity is defined between bowl liner 12 and crusher mantle 16. The lower portion of shaft 18 is journaled within the eccentric vertical bore of an eccentric 22 by means of a bearing sleeve or liner 23 positioned within the eccentric bore.

Eccentric 22 is cylindrical and is supported for rotation by pedestal-like inner frame portion 24, a bearing sleeve or liner 31 being positioned between eccentric 22 and frame portion 24 to journal eccentric 22 for rotation. Eccentric 22 is rotated by the engagement of ring gear 25 on the eccentric with a mating pinion gear 26 mounted on drive shaft 28. Rotation of eccentric 22 by gears 25, 26 imparts a gyratory movement to crusher head 14, as is well known in the art.

Shaft 18 and crusher head 14 may be vertically adjusted by any suitable means such as by admission of hydraulic fluid or the like into the space beneath the lower end of piston 32, attached to the lower end of shaft 18, to provide any necessary adjustment of the clearance between the crusher head 14 and bowl liner 12.

The upper end of shaft 18 is axially bored or otherwise provided with an upwardly open passage therein as indicated at 34 and a hollow cylindrical bearing sleeve 36 extends from the upper open end of bore 34 to a distance spaced axially upwardly a short height, such as one inch, for example, from the lower end of bore 34. Instead of a separate bearing sleeve 36, the inner surface of passage 34 could be used as the bearing surface, although the use of bearing sleeve 36 is preferable.

A spider assembly generally indicated at 37 is mounted at the upper end of upper frame section 4 of the crusher. Spider assembly 37 includes a radially inwardly extending arm or arms indicated at 38, including integral bracing webs 40, which support a centrally located hub-like member generally indicated at 42 having a downwardly open annular passage 44 therein bounding an axially downwardly extending spindle member 46. In the illustrated embodiment, spindle member 46 has mounted at the lower end thereof a bearing member 48 having a convex outer contour which cooperates with the bearing sleeve 36 or other bearing surface provided in passage or bore 34 to accommodate the movement of shaft 18 during the gyratory movement of crusher head 14. Bearing 48 is held in position on spindle 46 by suitable fastening and securing means 49. While a separate bearing 48 has been shown, it is also possible to provide a bearing integral with spindle 46. The portion of hub member 42 lying radially outwardly of annular passage 44 defines a sleeve 47 which surrounds and slidably receives the upper end of vertically adjustable shaft 18.

As the headcenter or crusher head 14 has gyratory motion imparted thereto by the rotation of eccentric 22, the upper end of shaft 18 will gyrate about the bearing 48 on spindle 46 as a fulcrum, bearing sleeve 36 providing a bearing surface on shaft 18 for the fulcruming action. The fulcrum defined by the bearing 48 with the contiguous surface of bearing sleeve 36 will always lie along the fulcrum line F—F in FIG. 1.

In order to provide oil lubrication for the bearing assembly, a vertical axial passage is provided in spindle 46 as indicated at 50. Passage 50 is connected in a suitable oil circulating circuit including a pump and a suitable filter. Passage 50 comunicates with a plurality of radial passages 52 in spindle 46, which in turn supply the lubricating oil to annular duct 54 which is in fluid communication with a plurality of radial outlets 56 in bearing 48. The lubricating oil is drained from the lower end of axial bore 34 through an outlet or drain passage 62 which extends axially downwardly through shaft 18 to an outlet passage 63, from whence the oil may return to a low pressure sump for recirculation.

In the view illustrated in FIG. 1, shaft 18 and crusher head 14 carried thereby are substantially at their lower extreme adjusted position and, may be adjusted upwardly with respect to the view shown in FIG. 1 to the maximum upward limiting position shown in dotted line or phantom position, in which the lower edge of the bearing sleeve 36 carried by shaft 18 is substantially aligned with the lower edge of spindle 46 or of bearing member 48 thereon. The chamber in the bore 34 of shaft 18 beneath the bottom surface of spindle 46 or of bearing 48 thereon is indicated at 58. It will be noted that the parts are so dimensioned that even in the upper extreme of the travel of shaft 18 relative to fulcrum bearing 48 on spindle 46 there is always at least a clearance space designated at 60 between the lower end of spindle 46 or of bearing 48 thereon and the bottom surface of bore 34 of shaft 18, corresponding substantially to the distance from the bottom edge of bearing sleeve 36 to the bottom surface of bore 34. The space 58 provides a chamber which permits a flushing action by the oil to rid the bearing cavity of foreign particles or the like, even in the most extreme upward position of shaft 18 in which chamber or cavity 58 is at its minimum volume indicated at 60. This clearance space may have a height, for example, of approximately one inch. The oil in chamber 58 passes outwardly therefrom through drain passages 62, 63 leading to a low pressure side of the lubrication system.

A seal 64 is provided between the inner surface of the outer sleeve portion of hub 42 and the outer surface of the upper portion of shaft 18 so that foreign matter, dust or the like can not enter into the interior of hub 42 and thus is kept out of contact with the bearing surfaces of bearing members 36 and 48. Thus, movement of bearing 36 relative to bearing 48 is accomplished in a dust-free atmosphere which is uncontaminated by the atmosphere of the rock crushing chamber.

A source of pneumatic pressure, not shown, may be connected to the interior of the annular space 44 to act as a positive pressure barrier against the admission of any foreign matter, dust or the like, past the seal 64 between hub 42 and the upper end of shaft 18.

In the operation of the gyratory crusher having the improved spider bearing assembly, the crusher head may be adjusted vertically for any of the usual reasons such as adjustment of the clearance between the bowl liner 12 and the crusher mantle 16, or for tramp metal relief or packing relief. In any adjusted position of the shaft and crusher head, bearing 48 on spindle 46 or equivalent integral bearing surface, which remains in a fixed position at all times, serves as a fulcrum for the gyrating shaft 18. Lubricating oil may be force fed from a suitable supply source by a pump (not shown), the oil passing through passages 50, 52, 54 and 56 to provide lubrication for the bearing surfaces 36 and 48. Chamber 58 beneath spindle 46, which is never less than the minimal size indicated at 60, provides in effect a flushing chamber through which the force fed oil passes, insuring a flushing away and removal of any foreign particles which may pass into the chamber 58. The outer sleeve 47 of the spider hub with its seal 64, is constantly in engagement with the outer surface of shaft 18 in any of its adjusted positions, and prevents entrance of any rock dust or the like into the interior of the bearing assembly. Air pressurization of the annular space 44 would further insure against entrance of rock dust or the like.

The structure hereinbefore described has many advantages, including the elimination of wear on the bearing contact surfaces caused by the abrasive and roughening contact of the crusher feed on the prior art main shaft or main shaft bearing sleeve. The construction hereinbefore described also eliminates contamination due to induction of rock dust in between the various bearing surfaces, due to vertical adjustment of the main shaft. The construction just described also permits the use of forced feed oil lubrication in place of the less satisfactory grease lubrication usually required in the prior art spider bearing constructions. The described construction also permits lowering of the crusher height since it permits lowering of the fulcrum of the crusher if desired. The described construction also permits reduction of the stresses at the upper portion of the crusher shaft. This is due to the fact the upper end of the crusher shaft is of subtantially uniform outer diameter, rather than having a reduced diameter upper portion terminating in a high stress shoulder region as in prior art constructions. The reduction in stress at the upper portion of the crusher shaft as just described permits the spider arm arch to be higher than in the prior art constructions, since the spider arm reinforcing web need not be as high, thereby allowing better distribution of feed in the crushing chamber.

While there has been shown and described a particular embodiment of the invention, it will be obvious to those skilled in the art that various changes and modifications may be made therein accordance with the invention and, therefore, it is aimed to cover all such changes and modifications as fall within the true spirit and scope of the invention.

The embodiments of the invention in which an exclusive property or privilege is claimed are defined as follows:

1. A gyratory crusher comprising a frame, an outer crushing member supported by said frame, a shaft carried by said frame, said shaft being provided with an upwardly open axial passage therein, an inner crushing member mounted on said shaft, means driving said shaft and said inner crushing member to impart a gyratory motion to said shaft and to said inner crushing member, a spider mounted on said frame, a downwardly extending spindle carried by said spider, said spindle being received in said upwardly open axial passage of said shaft to define a fulcrum for the gyratory movement of said shaft, and a sleeve carried by said spider in radially outwardly spaced relation from said spindle, said sleeve surrounding the outer periphery of an upper portion of said shaft.

2. A gyratory crusher as defined in claim 1 including means for effecting a vertical adjustment of said shaft and a corresponding adjustment of said inner crushing member.

3. A gyratory crusher as defined in claim 1 including bearing means on said spindle defining a fulcrum, and cooperating bearing means in said axial passage of said shaft.

4. A gyratory crusher as defined in claim 1 including means for supplying fluid lubricant between the surfaces of said spindle and said axial passage of said shaft.

5. A gyratory crusher as defined in claim 1 including sealing means between said sleeve and said shaft.

6. A gyratory crusher as defined in claim 2, in which said upwardly open axial passage of said shaft is so dimensioned relative to the amount of vertical adjustment of said shaft and to the location of said spindle that there is a predetermined minimal chamber beneath said spindle in the uppermost adjusted position of said shaft.

7. A gyratory crusher comprising a frame, an outer crushing member supported by said frame, a shaft carried by said frame, said shaft being provided with an upwardly open axial passage therein, an inner crushing member mounted on said shaft, means driving said shaft and said inner crushing member to impart a gyratory motion to said shaft and to said inner crushing member, a spider mounted on said frame, a hub carried by said spider, said hub having a downwardly open annular passage therein to define a spindle lying radially inwardly of said annular passage and a sleeve lying radially outwardly of said annular passage, the upper end of said shaft being slidably adjustably received in said annular passage, said spindle being received in said upwardly open axial passage of said shaft to define a fulcrum for the gyratory movement of said shaft, with said sleeve surrounding the outer periphery of said shaft.

8. A gyratory crusher as defined in claim 7 including means for effecting a vertical adjustment of said shaft and a corresponding adjustment of said inner crushing member.

9. A gyratory crusher as defined in claim 7 including bearing means on said spindle defining a fulcrum, and cooperating bearing means in said axial passage of said shaft.

10. A gyratory crusher as defined in claim 7 including means for supplying fluid lubricant between the surfaces of said spindle and said axial passage of said shaft.

11. A gyratory crusher as defined in claim 7 including sealing means between said sleeve and said shaft.

12. A gyratory crusher as defined in claim 7, in which said upwardly open axial passage of said shaft is so dimensioned relative to the amount of vertical adjustment of said shaft and to the location of said spindle that there is a predetermined minimal chamber beneath said spindle in the uppermost adjusted position of said shaft.

References Cited

UNITED STATES PATENTS

| | | | |
|---|---|---|---|
| 2,190,036 | 2/1940 | Morch | 241—208 X |
| 2,365,904 | 12/1944 | Peake | 241—213 X |
| 2,667,309 | 1/1954 | Becker | 241—211 |
| 2,977,057 | 3/1961 | Beyhl | 241—215 X |
| 3,345,000 | 10/1967 | Decker | 241—209 |

ROBERT C. RIORDON, Primary Examiner

D. G. KELLY, Assistant Examiner